United States Patent
Wu et al.

(10) Patent No.: US 8,248,536 B2
(45) Date of Patent: Aug. 21, 2012

(54) VIDEO LUMINANCE CHROMINANCE SEPARATION

(75) Inventors: Dongsheng Wu, Hainesport, NJ (US); Robert B. Prozorov, Holland, PA (US); Huijuan Liu, Bridgewater, NJ (US); Christopher D. Jurado, Blue Bell, PA (US); Daniel Zhu, Churchville, PA (US); Binning Chen, Newtown, PA (US)

(73) Assignee: ATI Technologies, Inc., Markham (CA)

( * ) Notice: Subject to any disclaimer, the term of this patent is extended or adjusted under 35 U.S.C. 154(b) by 620 days.

(21) Appl. No.: 12/296,357

(22) PCT Filed: Apr. 7, 2006

(86) PCT No.: PCT/US2006/013146
§ 371 (c)(1), (2), (4) Date: Sep. 30, 2009

(87) PCT Pub. No.: WO2007/117236
PCT Pub. Date: Oct. 18, 2007

(65) Prior Publication Data
US 2010/0045871 A1 Feb. 25, 2010

(51) Int. Cl.
*H04N 9/77* (2006.01)
*H04N 9/78* (2006.01)
*H04N 9/68* (2006.01)

(52) U.S. Cl. ......... 348/667; 348/645; 348/664; 348/666
(58) Field of Classification Search .................. 348/607, 348/645, 663–670
See application file for complete search history.

(56) References Cited

U.S. PATENT DOCUMENTS

| | | | |
|---|---|---|---|
| 3,283,066 A | 11/1966 | Sauvanet | |
| 3,751,581 A * | 8/1973 | Sakata et al. | 348/444 |
| 3,969,762 A | 7/1976 | Favreau | |
| 4,246,599 A | 1/1981 | Sugimoto et al. | |
| 4,706,112 A | 11/1987 | Faroudja et al. | |
| 4,814,862 A | 3/1989 | Travert | |
| 4,862,252 A * | 8/1989 | Kuroda | 348/666 |
| 4,922,331 A * | 5/1990 | Ezaki | 348/609 |
| 5,233,410 A * | 8/1993 | Fairhurst | 348/578 |
| 5,264,923 A * | 11/1993 | Bhang | 348/665 |
| 5,748,830 A * | 5/1998 | Jang | 386/307 |
| 5,786,871 A * | 7/1998 | Penney | 348/609 |
| 6,052,157 A * | 4/2000 | Weihs | 348/663 |
| 6,081,537 A * | 6/2000 | Kaneko et al. | 370/480 |
| 6,108,048 A | 8/2000 | Rinaldi | |

(Continued)

FOREIGN PATENT DOCUMENTS
EP 0597160 A1 5/1994
(Continued)

*Primary Examiner* — Brian Yenke
(74) *Attorney, Agent, or Firm* — Volpe and Koenig, P.C.

(57) ABSTRACT

The invention provides techniques for separating luma and chroma signal components in a composite SECAM video signal. During reception, the SECAM video signal is split into luma and chroma output. The amplitude of the chroma carrier is monitored during reception. If the chroma carrier amplitude is greater than a threshold, the value of the chroma output can be reduced. Also, if the chroma carrier amplitude is greater than another threshold, a portion of the chroma carrier can be added to the luma; or the trap band of the band-trap filter for extracting luma from the composite video can be reduced. The respective amount of the reduction in the chroma output and the increase in the luma output are independently determined but both may proportional to the magnitude of the deviation in the chroma carrier amplitude from the different thresholds.

10 Claims, 3 Drawing Sheets

U.S. PATENT DOCUMENTS

| | | | | |
|---|---|---|---|---|
| 6,118,919 A | * | 9/2000 | Hagino | 386/307 |
| 6,175,389 B1 | * | 1/2001 | Felts et al. | 348/663 |
| 6,392,714 B1 | * | 5/2002 | Steinberg et al. | 348/666 |
| 6,816,610 B1 | * | 11/2004 | Beckwith | 382/162 |
| 6,950,772 B1 | | 9/2005 | Callway | |
| 7,227,585 B1 | * | 6/2007 | Murdock et al. | 348/641 |
| 7,268,753 B2 | * | 9/2007 | Lee et al. | 345/77 |
| 7,420,625 B1 | * | 9/2008 | Woodall | 348/668 |
| 7,454,081 B2 | * | 11/2008 | Demas et al. | 382/268 |
| 7,474,357 B1 | * | 1/2009 | Murdock et al. | 348/665 |
| 7,532,254 B1 | * | 5/2009 | Woodall | 348/609 |
| 7,646,436 B1 | * | 1/2010 | Woodall | 348/668 |
| 7,920,211 B2 | * | 4/2011 | Honda | 348/609 |
| 8,045,061 B2 | * | 10/2011 | Jang | 348/624 |
| 2002/0028021 A1 | * | 3/2002 | Foote et al. | 382/224 |
| 2004/0028271 A1 | * | 2/2004 | Pollard et al. | 382/162 |
| 2011/0148910 A1 | * | 6/2011 | Botzas et al. | 345/600 |
| 2011/0149166 A1 | * | 6/2011 | Botzas et al. | 348/649 |

FOREIGN PATENT DOCUMENTS

| | | |
|---|---|---|
| GB | 2110044 A | 6/1983 |
| GB | 2332324 A | 6/1999 |
| WO | 9739589 A1 | 10/1997 |

* cited by examiner

VIDEO LUMINANCE CHROMINANCE SEPARATION

BACKGROUND

Color television standards have progressed with an emphasis on backwards compatibility to ensure new standards will function on older black and white televisions. As a result, modern color television standards call for a basic black and white brightness signal, called luminance (luma), as well as a color signal, called chrominance (chroma). Current color television encoding processes (e.g. NTSC, PAL and SECAM) provide this color and brightness information by summing up the luma and chroma signals in an overlay frequency spectrum and results in a so-called composite signal. The video decoding system must separate the luma and chroma signals from the composite signal and decode these signals to obtain the video components.

In a SECAM based system, the chroma information is modulated on a subcarrier through frequency modulation, and luma information is carried in the baseband with spectrum beyond the chroma's subcarrier. In the receiving system, the luma and chroma are often separated using band-trap filter and band-pass filters. A band-trap filter is used to suppress the chroma subcarrier to capture the luma spectrum, and the band-pass filter is used to capture the chroma spectrum. The quality of the image derived from the luma and chroma spectrums is dependent on the bandwidths of both the band-trap filter and the band-pass filters. For example in separating luma from the composite video, if the trap band of the band-trap filter is narrow, a portion of the chroma signal will appear in the luma signal, his result is known in the art as dot crawl; if the trap band of the band-trap filter is wide, the luma will lose sharpness. Conversely in separating chroma from the composite video, if the bandwidth of the band-pass filter is wide, a portion of the luma signal will leak into the chroma signal, known in the art as false color; if the bandwidth of the band-pass filter is narrow, the chroma will lose sharpness.

In general, the bandwidths of the band-trap and band-pass filters for any particular SECAM application are static values based on a design compromise between sharpness and artifacts. As a result of these static values, the ability to separate the luma and chroma signals at various points in the frequency spectrum is reduced.

SUMMARY

In general, in an aspect, the invention provides an apparatus for generating a video image, the apparatus configured to separate a video signal into a luminance component and a chrominance component, and to generate a feedforward control signal based on the amplitude of a demodulated FM signal associated with the chrominance component.

Implementations of the invention may include one or more of the following features. A signal adder configured to add a portion of the chrominance component to the luminance component, the amount of the chrominance component added to the luminance component may be function of the feedforward control signal. A signal reducer configured to remove at least a portion of the chrominance component from the video image, the amount of the chrominance component is reduced may be function of the feedforward control signal.

In general, in another aspect, the invention provides a luminance-chrominance separation device. A video signal is separated into a luminance signal and a chrominance signal and a portion of the chrominance signal is fed forward into the luminance signal.

Implementations of the invention may include one or more of the following features. The amount of chrominance signal fed forward into the luminance signal is based on the amplitude of a demodulated FM signal associated with the chrominance signal. A portion of the chrominance signal may be removed from a chrominance output.

In general, in another aspect, the invention provides an apparatus, for use in a receiver configured to receive an electronic video signal. The video signal includes a first component that is encoded with amplitude modulation and a second component that is encoded with frequency modulation on a carrier frequency. The apparatus includes a first filter device configured to receive the video signal and output a substantial portion of the first component as a received first component, a second filter device configured to receive the video signal and output a substantial portion of the second component as a received second component, a leakage detector device configured to receive the carrier frequency of the second component and output a leakage detection signal, and a variable signal adder configured to receive the leakage detection signal and to make a determination as to whether to add a portion of the received second component to the received first component.

In general, in another aspect, the invention provides an apparatus, for use in a receiver configured to receive an electronic video signal. The video signal includes a first component that is encoded with amplitude modulation and a second component that is encoded with frequency modulation on a carrier frequency. The apparatus includes a second filter device configured to receive the video signal and output a substantial portion of the second component as a received second component, a leakage detector device configured to receive the carrier frequency of the second component and output a leakage detection signal, and a first filter device with variable trap band configured to received the video signal and output a substantial portion of the first component.

Implementations of the invention may include one or more of the following features. The variable signal adder is configured to determine a difference between the leakage detection signal and a first threshold. The variable signal adder is configured to add a portion of the received second component to the received first component, such that the magnitude of the received second component added to the received first component is based a lookup table which includes a value representing the difference between the leakage detection signal and the first threshold, and the magnitude of the received second component to be added to the first component. The magnitude of the received second component added to the received first component is proportional to the difference between the leakage detection signal and the first threshold. The magnitude of the received second component added to the received first component is linearly proportional to the difference between the leakage detection signal and the first threshold. The magnitude of the received second component added to the received first component is geometrically proportional to the difference between the leakage detection signal and the first threshold. The first filter device, the second filter device, the leakage detector device, and the variable signal adder are disposed on a semiconductor chip.

Also, implementations of the invention may include a variable signal reducer configured to receive the leakage detection signal and to make a determination as to whether to reduce a portion of the received second component.

In general, in another aspect, the invention provides an apparatus, for use in a receiver configured to receive an electronic video signal. The video signal includes a first component that is encoded with amplitude modulation and a second component that is encoded with frequency modulation on a carrier frequency. The apparatus includes a first filter device configured to receive the video signal and output a substantial portion of the first component as a received first component, a second filter device configured to receive the video signal and output a substantial portion of the second component as a received second component, a leakage detector device configured to receive the carrier frequency of the second component and output a leakage detection signal, a demodulation device configured to demodulate the received second component and output a second component signal, and a variable signal reducer configured to receive the leakage detection signal and to make a determination as to whether to reduce a portion of the second component signal.

Implementations of the invention may include one or more of the following features. The variable signal reducer is configured to determine a difference between the leakage detection signal and a first threshold. The variable signal reducer is configured to remove a portion of the second component signal, such that the magnitude of the second component signal removed is based a lookup table which includes a value representing the difference between the leakage detection signal and the first threshold, and the magnitude of second component signal to be removed. The magnitude of the second component signal removed is proportional to the difference between the leakage detection signal and the first threshold. The entire second component signal may be removed.

Also, implementations of the invention may include a variable signal adder configured to receive the leakage detection signal and to make a determination as to whether to add a portion of the received second component to the received first component.

In general, in another aspect, the invention provides a method of decoding digital or analog composite SECAM video signals. The composite SECAM video signal includes an amplitude modulated luminance signal, a frequency modulated chrominance signal, and a chrominance carrier signal. The method includes filtering the composite SECAM video signal into a received luminance signal and a received chrominance signal, monitoring the amplitude of the chrominance carrier signal, and adding a portion of the received chrominance signal into the received luminance signal if the amplitude of the chrominance carrier signal exceeds a first threshold.

Implementations of the invention may include one or more of the following features. Determining the magnitude of the received chrominance signal to be added to the received luminance signal based on the magnitude of the difference between the amplitude of the chrominance carrier signal and the first threshold value. Selecting the magnitude of the received chrominance signal to add to the received luminance signal from a previously stored lookup table. Calculating the magnitude of the received chrominance signal to add to the received luminance signal based on a linear function. Calculating the magnitude of the received chrominance signal to add to the received luminance signal based on a geometric function. Demodulating the received chrominance signal to produce a chrominance output.

Also, implementations of the invention may include one or more of the following features. Removing a portion of the chrominance output if the amplitude of the chrominance carrier signal exceeds a second threshold. Determining the magnitude of chrominance output to be removed based on the magnitude of the difference between the amplitude of the chrominance carrier signal and the second threshold value, including even reducing the chrominance output to zero.

In general, in another aspect, the invention provides an integrated circuit chip for use for decoding a composite SECAM video signal. The composite SECAM video signal includes an amplitude modulated luminance signal, a frequency modulated chrominance signal, and a chrominance carrier signal. The chip includes a memory including stored instructions, and a processor coupled to the memory and configured to read the instructions from the memory to perform digital signal processing to decode the composite SECAM video signal. To decode the composite SECAM video signal the processor will transform the composite SECAM video signal into a received luminance signal, a received chrominance signal, and a received chrominance carrier signal, monitor the amplitude of the received chrominance carrier signal, determine that the received chrominance signal includes a portion of the received luminance signal if the amplitude of the received chrominance carrier signal exceeds a first threshold value, and add a portion the received chrominance signal into the received luminance signal if the amplitude of the received chrominance carrier signal exceeds the first threshold value.

Implementations of the invention may include one or more of the following features. To decode the composite SECAM video signal, the processor further will determine the amount of the received chrominance signal to add to the received luminance signal based on the magnitude of the difference between the received chrominance carrier signal and the first threshold value. To decode the composite SECAM video signal, the processor further will demodulate the received chrominance signal to produce a chrominance output, and remove a portion of the chrominance output if the amplitude of the received chrominance carrier signal exceeds a second threshold value. To decode the composite SECAM video signal, the processor further will determine the amount of the chrominance output to remove based on the magnitude of the difference between the received chrominance carrier signal and the second threshold value.

In accordance with implementations of the invention, one or more of the following capabilities may be provided. Video images can be derived from a SECAM video signals. The SECAM video signal can divided into luminance and chrominance components. The derived video images can be adjusted by adding a portion of the chrominance component into luminance component. The video image can also be adjusted by removing portions of the chrominance component.

These and other capabilities of the invention, along with the invention itself, will be more fully understood after a review of the following figures, detailed description, and claims.

DETAILED DESCRIPTION OF PREFERRED EMBODIMENTS

Embodiments of the invention provide techniques for separating luminance and chrominance signal components in a composite SECAM video signal. Luminance (luma) is carried on the baseband. Chrominance (chroma) is encoded and modulated on the carrier signal with Frequency Modulation (FM). During reception, the SECAM video signal is split into luma and chroma output. The luma output is produced by applying a band-trap filter to the video signal. The chroma carrier is isolated by applying a band-pass filter to the video signal, and the chroma output is produced by demodulating and decoding the chroma carrier. The amplitude of the chroma carrier is monitored during reception. Since the chroma carrier signal is frequency modulated, the amplitude should remain within a nominal value. Therefore, deviations in the amplitude of the chroma carrier indicate that the luma signal is present in the chroma spectrum. The magnitude of the deviation in the chroma carrier amplitude is proportional to the amount of luma in the chroma spectrum. Thus, the magnitude of the deviation is compared to a threshold amplitude value. If the deviation in the chroma carrier amplitude is greater than the threshold amplitude, the value of the chroma output can be reduced. Also, if the deviation in the chroma carrier amplitude is greater than the threshold amplitude, the trap band of the band-trap filter can be reduced, or a portion of the chroma carrier can be added to the luma. The respective amounts of reduction in the chroma output and increase in the luma output are preferably independently determined yet both proportional to the magnitude of the deviation in the chroma carrier amplitude. This technique for separating luminance and chrominance signal components in a SECAM encoded video signal is exemplary, however, and not limiting of the invention as other implementations in accordance with the invention are possible.

Figure 1:
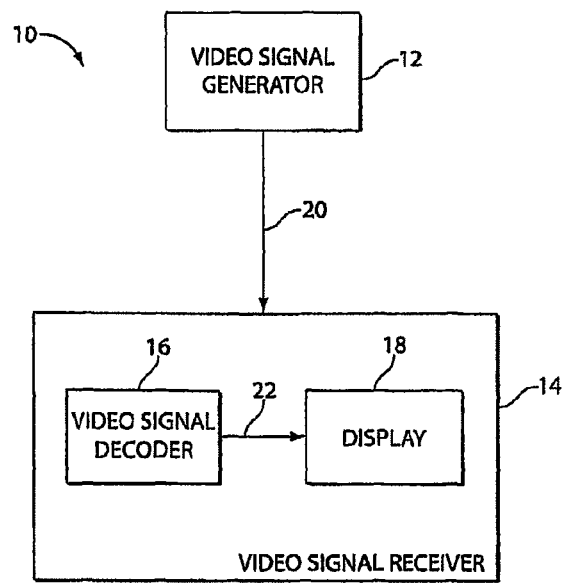
FIG. 1 is a block diagram of a system for processing a video signal.

Referring to FIG. 1, a video system 10 for transferring visual information from one point to another includes a video signal generator 12 and a video signal receiver 14. The system 10 is configured to produce, transmit, receive and display video signals.

The video signal generator 12 is configured to produce a video signal 20. The video signal 20 includes encoded digital and analog formats such as HDMI (digital YCbCr), DVI (digital RGB), Analog YPbPr, Analog RGB, Analog S-Video and Analog composite (e.g. NTSC, PAL and SECAM). The video generator 12 may be, but is not limited to, a source such as a VCR, DVD player, a channel on a local television broadcast, cable television, a satellite system, internet broadcasts, game consoles, or graphics circuits integrated in a computer. The generator 12 is further configured to send the signal 20, e.g. over a wire or wirelessly, to the receiver 14.

The video signal receiver 14 is configured to receive and process the signal 20 and includes a video signal decoder 16 and a display 18. The video signal receiver 14 may be, but is not limited to, a device such as a television, a computer, a VCR, a digital recorder, a satellite set-top receiver, and an integrated circuit within a larger video system (e.g. multi-screen display systems, video editing equipment). The video signal decoder 16 and display 18 can be integrated within the video signal receiver 14, or they can be independent components which are operationally connected to the video signal receiver 14. The video signal decoder 16 is configured to receive and decode the signal 20 and to output a display signal 22. The video signal decoder 16 can transform the video signal 20 into the display signal 22. The video signal decoder 16 is configured to except a known video signal format (e.g. HDMI, DVI, Analog RGB, Analog composite) and output the display signal 22 to the display 18 (e.g. CRT, LCD, Plasma). The video signal decoder 16 may also perform digital-to-analog (D/A) conversion followed by an analog-to-digital (A/D) conversion to produce the display signal 22.

Figure 2:
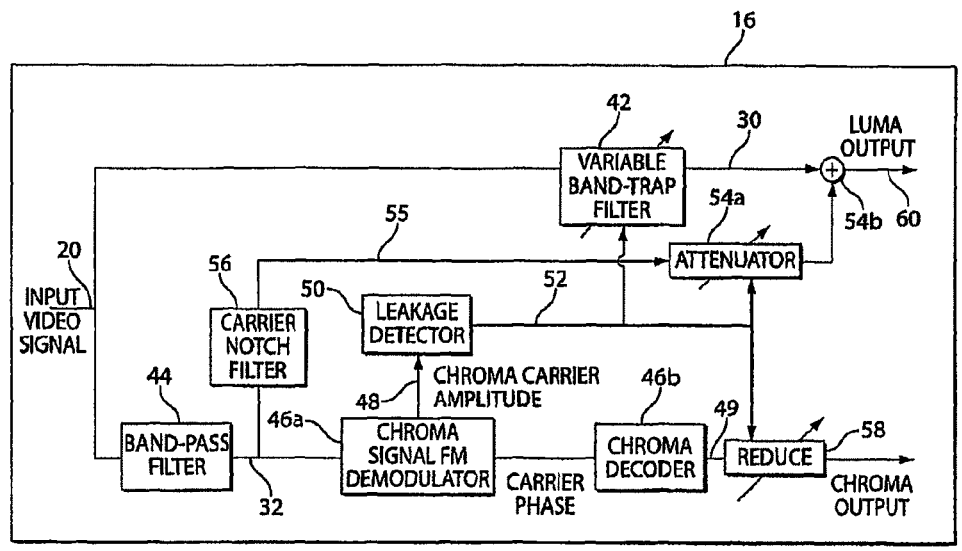
FIG. 2 is a block diagram of a system for processing luminance and FM-modulated chrominance information in video signals.

Referring also to FIG. 2, the video signal decoder 16 includes a component for separating luma and chroma in composite SECAM formatted video signals 20. Such a composite SECAM video signal 20 includes a baseband luma signal and an FM modulated chroma signal. The video signal decoder 16 includes a variable band-trap filter 42, a band-pass filter 44, a chroma signal demodulator 46a and a chroma decoder 46b, a leakage detector 50, a variable signal attenuator 54a, an adder 54b, a carrier notch filter 56, and a variable signal reducer 58. The video signal decoder 16 is configured to separate the luma and chroma signals, demodulate and decode the chroma signal, and depending on the quality of the separation, to adjust the bandwidth of the variable trap-band filter, add various amounts of the chroma signal to the luma signal, and to reduce the chroma signal by various amounts.

Figure 3:
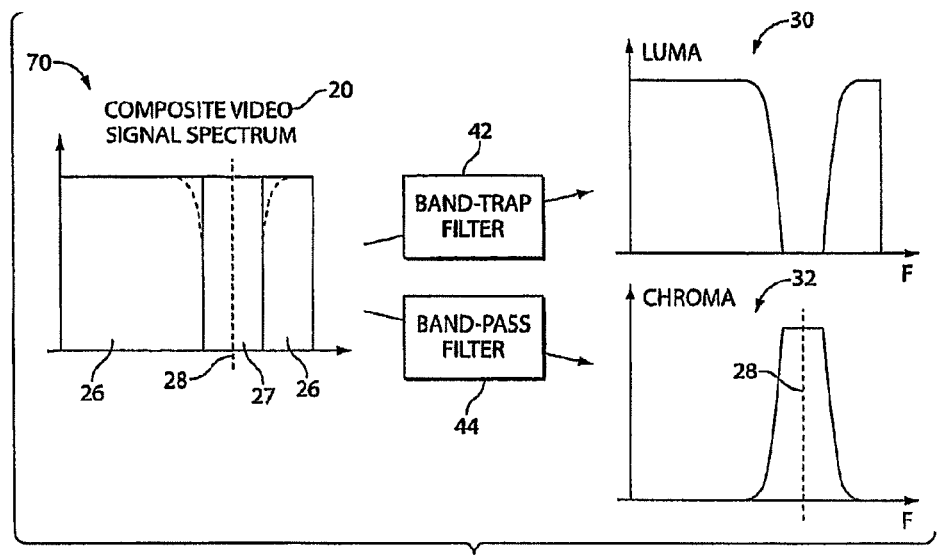
FIG. 3 is a graphical and block representation of a system to separate chrominance and luminance signals in a SECAM video signal.

The variable band-trap filter 42 is configured to receive and filter the video input signal 20 to remove the received chroma spectrum 32 while allowing a received luma signal 30 to pass through. Referring to FIG. 3, an exemplary system 70 receives a composite video signal 20 that includes a luma spectrum 26 and a chroma spectrum 27 which is FM modulated on the chroma carrier signal 28. The band-trap filter 42 is configured to filter the video input signal 20 to remove its chroma signal 32 while allowing its luma signal 30 to pass through. The band-trap filter 42 is designed to have a frequency response that provides desired operation of the system 70. If the trap band is too narrow, a portion of the chroma signal may be interpreted as luma which will result in a degraded image condition known as "dot crawl" (i.e., an artifact of video decoding in which dots seem to crawl between contrasting colors). If the trap band of the band-trap filter 42 is too wide, a portion of the luma signal will be lost which will result in a degraded image in terms of luma sharpness. Referring back to FIG. 2, the band-pass filter 44 in the video signal decoder 16 is configured to receive and filter the video input signal 20 to remove the received luma spectrum while allowing the received chroma signal 32 to pass through. Referring to FIG. 3, the system 70 includes a band-pass filter 44 configured to receive the composite video signal 20 and remove its luma signal while allowing its chroma signal 32 to pass through. The band-pass filter 44 and band-trap filter 42 are independent, e.g., the bandwidths of the pass band and trap band need not be complementary. The band-pass filter 44 is designed to have a bandwidth that provides desired circuit operation. If the bandwidth of the band-pass filter 44 is too wide, the decoded color may contains false color. Conversely if the bandwidth of the band-pass filter 44 is too narrow, the result image may be degraded in terms of color sharpness. Thus, the bandwidths for the band-trap filter 42 and the band-pass filter 44 are selected and accordingly configured to accommodate the expected range of the frequency spectrum of the video input signal 20.

Referring back to FIG. 2, the chroma signal 32 is received by the carrier notch filter 56 and the chroma signal demodulator 46a and decoder 46b.

The carrier notch filter 56 (e.g. a narrow notch filter) is configured to remove the chroma signal 27 which is FM modulated by carrier frequency 28 from the chroma signal 32 to reduce the "dot crawl" video artifact in the resulting video image. The carrier notch filter 56 outputs a complementary luma signal 55 to the variable signal attenuator 54a and adder 54b.

The chroma signal demodulator 46a and decoder 46b are configured to receive the chroma signal 32 and to output an instantaneous chroma carrier magnitude signal 48 and a base chroma output signal 49. As discussed above, the video signal 20 includes a chroma spectrum 27 that is encoded with Frequency Modulation. The chroma signal demodulator 46a and decoder 46b is configured to demodulate the chroma signal 32 with a known FM demodulation technique (e.g., CORDIC, PLL, or DSP) to output the base chroma output signal 49 to the variable signal reducer 58.

Figure 4:
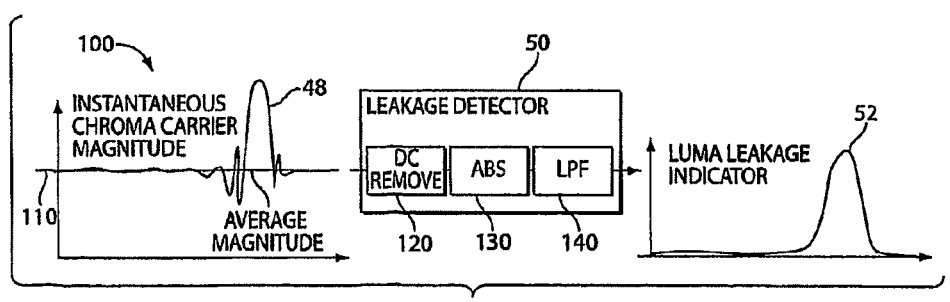
FIG. 4 is a graphical and block diagram of use of a luminance leakage detector.

The chroma signal demodulator 46a and decoder 46b are also configured to monitor the amplitude of the chroma carrier signal 28 portion of the chroma signal 32 and output an instantaneous chroma carrier magnitude signal 48 to the leakage detector 50. Referring to FIG. 4, the system 100 includes the instantaneous chroma carrier magnitude signal 48, the leakage detector 50, and the luma leakage indicator signal 52. The leakage detector 50 includes a DC removal device 120, an absolute value calculator device 130, and a low pass filter device 140. The leakage detector 50 is configured to provide a leak indicator signal 52 for use in determining whether too much of the luma spectrum 26 is in the chroma signal 32. The average magnitude signal 110 is the averaged chroma carrier magnitude 48 during colorburst. The DC removal device 120 subtracts the averaged chroma carrier magnitude 110 from the instantaneous chroma carrier magnitude signal 48. The absolute value device 130 converts deviations in the instantaneous chroma carrier magnitude signal 48 which could be below an average magnitude 110 (and thus below zero) to positive values. The low pass filter device 140 is to remove signal spikes from the instantaneous chroma carrier magnitude signal 48. The low pass filter device 140 can be implemented in a simple IIR filter or FIR filter. The output of the leakage detector 50 is the luma leakage indicator signal 52. Leakage of the luma spectrum 26 into the chroma signal 32 will cause the luma leakage indicator signal 52 to exceed a threshold value. The level of the deviation between the luma leakage indicator signal 52 and the threshold value is proportional to the magnitude of the luma spectrum 26 in the chroma signal 32.

Referring back to FIG. 2, the variable band-trap filter 42 in the video signal decoder 16 receives the input video signal 20 and suppresses the chroma carrier 27 to generate luma signal 30. In general, the variable band-trap filter 42 is implemented using a FIR (finite impulse response) filter with programmable coefficients. Multiple sets of coefficients with different trap bands can be selected. The variable band-trap filter 42 is configured to compare the luma leakage indicator signal 52 to a threshold value and quantize the comparison result. The quantized comparison result is used to select different set of filter coefficients. For example, when the luma leakage indicator signal 52 is below the threshold, a set of nominal coefficients is used. When the luma leakage indicator signal 52 is higher than the threshold, which indicates that the chroma carrier 32 contains luma signal, a set of band-trap filter coefficients which narrow the trap band is selected. In general, the width of the trap band is inversely proportional to the magnitude of the difference between the leakage indicated signal 52 and the threshold value, e.g., the larger the difference, the narrower of the trap band.

Referring back to FIG. 2, the variable attenuator 54a in the video signal decoder 16 receives the complementary luma signal 55 and the luma leakage indicator signal 52. The variable attenuator 54a is configured to compare the luma leakage indicator signal 52 to a threshold value and inversely attenuate the complementary luma signal 55. For example, when the luma leakage indicator signal 52 is below the threshold, the complementary luma signal 55 is attenuated to zero. The adder 54b adds the attenuated complementary luma signal into the luma signal 30. The threshold value may be determined in a variety of manners, e.g., based on user preference settings (e.g., variables in a software program), or an average value based on a stochastic sample (e.g., a process feedback algorithm). Also, for example, the threshold value could be a fixed value that is integrated into the circuit design through digital or analog components. The variable attenuator 54a and adder 54b can calculate a difference between the luma leakage indicator signal 52 and the threshold value, and inject a portion of the complementary luma signal 55 into the luma signal 30 based on the magnitude of the difference between the leakage indicator signal 52 and the threshold value to produce a luma output signal 60. The magnitude of the complementary luma signal 55 added to the luma signal 30 is preferably inversely, e.g., linearly, proportional to the magnitude of the difference between the leakage indicated signal 52 and the threshold value. For example, if the deviation in the leakage indicator signal 52 and the threshold value is small, then a small amount of complementary luma signal 55 is injected into the luma spectrum to produce a slightly increased luma output signal 60. The larger the deviation, the larger is the amount of the complementary luma signal 55 injected into the luma signal 30. The relationship between the magnitude of the deviation and the magnitude of the injected signal need not be limited to a linear function. Other acceptable relationships include geometric, logarithmic or multivariate functions.

The variable signal reducer 58 is configured to receive the luma leakage indicator signal 52 and the chroma output signal 49, and can compare the luma leakage indicator signal 52 to a threshold value. The threshold value in the variable signal reducer 58 can be independent of the threshold value used in the variable attenuator 54a. The threshold value in the variable signal reducer 58 may be determined in a variety of manners, e.g., based on user preference settings (e.g. a variable in a software program), or an average value based on a stochastic sample (e.g. a process feedback algorithm). Also, for example, the threshold value could be a fixed value that is integrated into the circuit design through digital or analog circuit components. The variable signal reducer 58 can calculate a difference between the luma leakage indicator signal 52 and the threshold value, and reduce the decoded chroma output 49 based on the magnitude of the difference between the leakage indicator signal 52 and the threshold value. The magnitude of the reduction in the decoded chroma output 49 is preferable directly, e.g. linearly, proportional to the magnitude of the difference between the leakage indicated signal 52 and the threshold value. For example, if the deviation in the leakage indicator signal 52 and the threshold value is small, then the decoded chroma output 49 is reduced slightly, resulting in a chroma output signal 62 that is slightly lower than the decoded chroma output 49. The larger the deviation, the larger the reduction in the decoded chroma output signal 49. For example, the decoded chroma output signal 49 may be reduced completely, resulting in a chroma output signal 62 of zero (i.e. no color). The relationship between the magnitude of the deviation and the magnitude of the chroma reduction need not be limited to a linear function. Other acceptable relationships include geometric, logarithmic or multivariate functions.

Figure 5:
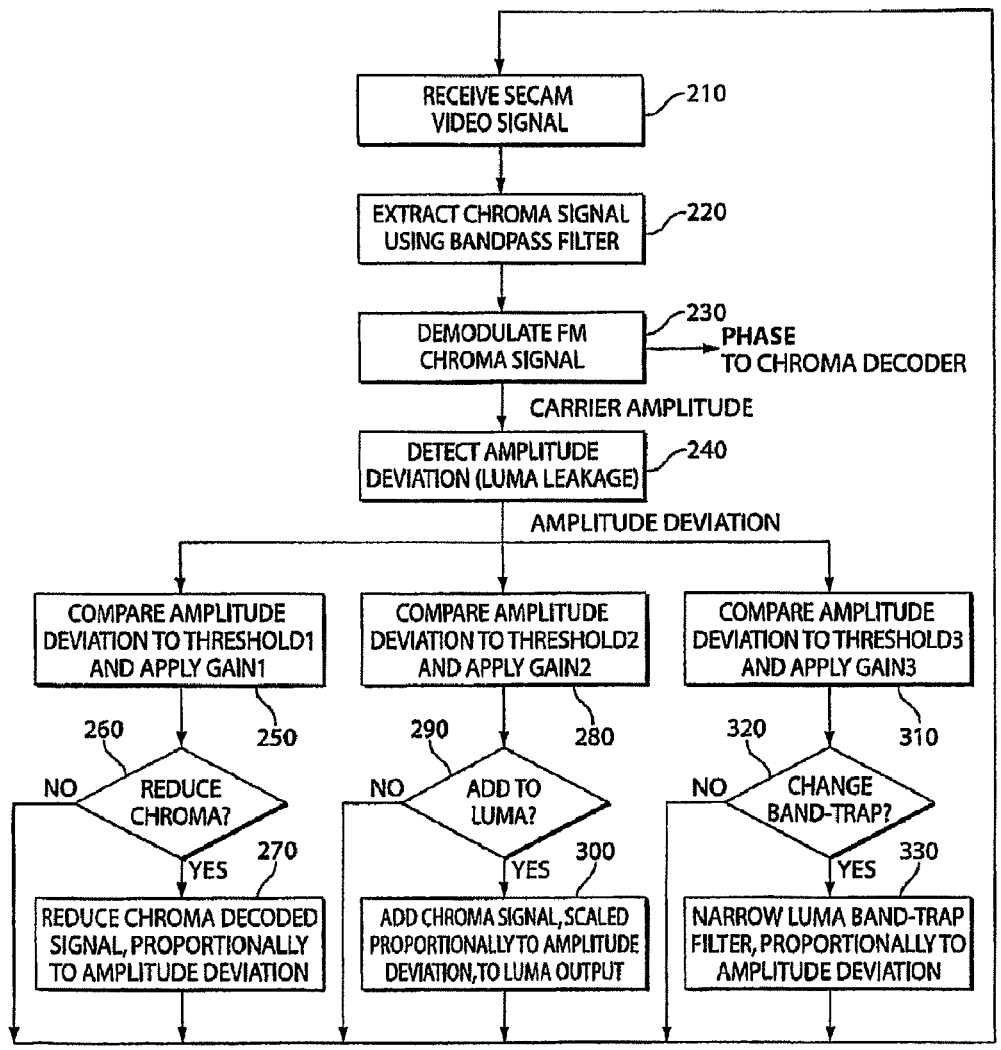
FIG. 5 is a block flow diagram of a process to separate chrominance and luminance signals in a SECAM video signal.

In operation, referring to FIG. 5, with further reference to FIG. 2 and FIG. 4, a process 200 for separating luminance and FM chrominance signal components in a video signal using the video signal decoder 16 includes the stages shown. The process 200, however, is exemplary only and not limiting. The process 200 may be altered, e.g., by having stages added, removed, or rearranged.

At stage 210, a SECAM video signal is received by the video signal decoder 16 and provided to the band-trap filter 42 and the band-pass filter 44.

At stage 220, the SECAM video signal received at stage 210 is filtered via band-pass filter to extract chroma carrier signal 32. The carrier notch filter 42 removes chroma carrier frequency from the chroma carrier signal 32.

At stage 230, the chroma carrier signal 32 is demodulated through FM demodulation techniques. During the demodulation, the magnitude of the amplitude of the FM carrier is generated.

At stage 240, the magnitude of the amplitude of the known chroma carrier is monitored. The instantaneous chroma carrier magnitude signal 48 is received by the leakage detector 50 and transformed to the luma leakage indicator signal 52 via the DC removal device 120, the absolute value calculator device 130, and the low pass filter device 140. The DC removal device removes the DC bias in the instantaneous chroma carrier magnitude signal 48, e.g., the average magnitude 110 during colorburst. The absolute value calculator device 130 converts signal values that are below the average magnitude 110 to positive values to produce a signal containing all positive values. The low pass filter 140 removes spikes, e.g. smoothens, the signal and outputs the luma leakage indicator signal 52.

At stage 250, the variable signal reducer 58 compares the value of the luma leakage indicator signal 52 from the leakage detector 50 to a first threshold value. Deviations between the magnitude of the luma leakage indicator signal 52 and the first threshold value indicate that a portion of the luma spectrum 26 is leaking into the chroma signal 32 which could cause false color. A decision is made at stage 260 as to whether a portion of the base chroma signal 49 will be reduced. If so, stage 270 reduces decoded chroma 49 proportionally and generates chroma output 62 with reduced false color.

The amount of the decoded chroma signal 49 reduced is preferably proportional to the magnitude of the difference between the luma leakage indicator signal 52 and the first threshold value. If the difference is small, only a small amount of decoded chroma signal 49 is reduced. The larger the difference, the larger the amount of base chroma signal 49 removed. For example, the decoded chroma output signal 49 may be reduced completely, resulting in a chroma output signal 62 with no color. The relationship between the magnitude of the difference and the amount of base chroma signal 49 reduced is preferably direct (e.g. linear), but other acceptable relationships can be based on user defined data tables, or other geometric, logarithmic and multivariate functions.

At stage 280, the variable attenuator 54a compares the values of the luma leakage indicator signal 52 from the leakage detector 50 to a second threshold value. Deviations between the magnitude of the luma leakage indicator signal 52 and the second threshold value indicate that the chroma signal 32 contains piece of luma information. A decision is made at stage 290 as to whether to add the complementary luma signal 55 to the luma signal 30. If so, then stage 300 adjusts the attenuation for the complementary luma signal 55 proportionally and adds it into luma signal 30 to generate the final luma output 60.

The amount of the complementary luma signal 55 injected into the luma signal 30 is preferably proportional to the magnitude of the difference between the luma leakage indicator signal 52 and the second threshold value. If the difference is small, only a small amount of complementary luma signal 55 is injected into the luma signal 30. The larger the difference, the larger the amount of complementary luma signal 55 injected into the luma signal 32. The relationship between the magnitude of the difference and the amount of complementary luma signal 55 injected into the luma signal 30 is preferably direct (e.g. linear), but other acceptable relationships can be based on user defined data tables, or other geometric, logarithmic and multivariate functions.

At stage 310, the variable band-trap filter 42 compares the values of the luma leakage indicator signal 52 from the leakage detector 50 to a third threshold value. Deviations between the magnitude of the luma leakage indicator signal 52 and the third threshold value indicate that a portion of the luma spectrum 26 is leaking into chroma signal. A decision is made at stage 320 as to whether to reduce the trap band of the variable band-trap filter. If so, then another set of filter coefficients corresponding to a narrower trap band are used in the trap-band filter.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations. The invention is capable of processing both analog and digital video signals.

Further, while the description above refers to the invention, the description may include more than one invention.

What is claimed is:

1. An apparatus, for use in a receiver configured to receive an electronic video signal, wherein the video signal includes a luminance component that is encoded with amplitude modulation and a chrominance component that is encoded with frequency modulation on a carrier frequency, the apparatus comprising:
   a first filter device configured to receive the video signal and output a substantial portion of the luminance component as a received luminance component;
   a second filter device configured to receive the video signal and output a substantial portion of the chrominance component as a received chrominance component;
   a leakage detector device configured to receive the carrier frequency of the chrominance component and output a leakage detection signal; and
   a variable signal adder configured to receive the leakage detection signal and to make a determination as to whether to add a portion of the received chrominance component to the received luminance component; and
   wherein the first filter device is further configured to receive the leakage detection signal, compare the leakage detection signal to a first threshold and adjust the filtering bandwidth of the first filter device based on the comparison.

2. The apparatus of claim 1 wherein the variable signal adder determining whether to add a portion of the received chrominance component to the received luminance component includes determining a difference between the leakage detection signal and a second threshold.

3. The apparatus of claim 1 further comprising a variable signal reducer configured to receive the leakage detection signal and to make a determination as to whether to reduce a portion of the received chrominance component.

4. The apparatus of claim 1 wherein the first filter device, the second filter device, the leakage detector device, and the variable signal adder are disposed on a semiconductor chip.

5. An apparatus, for use in a receiver configured to receive an electronic video signal, wherein the video signal includes a luminance component that is encoded with amplitude modulation and a chrominance component that is encoded with frequency modulation on a carrier frequency, the apparatus comprising:
- a first filter device configured to receive the video signal and output a substantial portion of the luminance component as a received luminance component;
- a second filter device configured to receive the video signal and output a substantial portion of the chrominance component as a received chrominance component;
- a leakage detector device configured to receive the carrier frequency of the chrominance component and output a leakage detection signal;
- a demodulation device configured to demodulate the received chrominance component and output a chrominance component signal; and
- a variable signal reducer configured to receive the leakage detection signal and to make a determination as to whether to reduce a portion of the chrominance component signal; and
- wherein the first filter device is further configured to receive the leakage detection signal, compare the leakage detection signal to a first threshold and adjust the filtering bandwidth of the first filter device based on the comparison.

6. The apparatus of claim 5 wherein the variable signal reducer determining whether to remove a portion of the chrominance component signal includes determining a difference between the leakage detection signal and a first second threshold.

7. The apparatus of claim 5 wherein the entire chrominance component signal is removed.

8. The apparatus of claim 5 further comprising a variable signal adder configured to receive the leakage detection signal and to make a determination as to whether to add a portion of the received chrominance component to the received luminance component.

9. An apparatus, for use in a receiver configured to receive an electronic video signal, wherein the video signal includes a first color component that is encoded with amplitude modulation and a second color component that is encoded with frequency modulation on a carrier frequency, the apparatus comprising:
- a first filter device configured to receive the video signal and output a substantial portion of the first color component as a received first color component;
- a second filter device configured to receive the video signal and output a substantial portion of the second color component as a received second color component;
- a leakage detector device configured to receive the carrier frequency of the second color component and output a leakage detection signal; and
- a variable signal adder configured to receive the leakage detection signal and to make a determination as to whether to add a portion of the received second color component to the received first color component; and
- wherein the first filter device is further configured to receive the leakage detection signal, compare the leakage detection signal to a first threshold and adjust the filtering bandwidth of the first filter device based on the comparison.

10. A method of video separation in a receiver configured to receive an electronic video signal, wherein the video signal includes a first color component that is encoded with amplitude modulation and a second color component that is encoded with frequency modulation on a carrier frequency, the method comprising:
- receiving the video signal;
- outputting a substantial portion of the first color component as a received first color component;
- outputting a substantial portion of the second color component as a received second color component;
- receiving the carrier frequency of the second color component and outputting a leakage detection signal;
- receiving the leakage detection signal and making a determination as to whether to add a portion of the received second color component to the received first color component;
- comparing the leakage detection signal to a first threshold; and
- adjusting the filtering bandwidth of the first filter device based on the comparison.

* * * * *

UNITED STATES PATENT AND TRADEMARK OFFICE
CERTIFICATE OF CORRECTION

| | | |
|---|---|---|
| PATENT NO. | : 8,248,536 B2 | Page 1 of 1 |
| APPLICATION NO. | : 12/296357 | |
| DATED | : August 21, 2012 | |
| INVENTOR(S) | : Wu et al. | |

It is certified that error appears in the above-identified patent and that said Letters Patent is hereby corrected as shown below:

IN THE CLAIMS

Column 11, Line 32, Claim 6, delete the word "first".

Signed and Sealed this
Twenty-fifth Day of December, 2012

David J. Kappos
*Director of the United States Patent and Trademark Office*